United States Patent
Holling et al.

[11] Patent Number: 5,995,710
[45] Date of Patent: Nov. 30, 1999

[54] SPEED CONTROL FOR BRUSHLESS DC MOTORS

[75] Inventors: George H. Holling, Sun Prairie; Mark Yeck; Michael Schmitt, both of Ripon, all of Wis.

[73] Assignee: Advanced Motion Controls, Inc., Sun Prairie, Wis.

[21] Appl. No.: 09/122,497

[22] Filed: Jul. 24, 1998

[51] Int. Cl.$^6$ .................................................. H02P 5/178

[52] U.S. Cl. .................................... 388/811; 318/439

[58] Field of Search ............................ 388/811, 819, 388/804, 921, 829, 831; 372/254, 439, 136

[56] References Cited

U.S. PATENT DOCUMENTS

| | | | |
|---|---|---|---|
| 4,053,820 | 10/1977 | Peterson et al. | 363/44 |
| 4,697,125 | 9/1987 | Goff et al. | 318/254 |
| 5,191,270 | 3/1993 | McCormack . | |
| 5,317,243 | 5/1994 | Cameron | 318/254 |
| 5,327,053 | 7/1994 | Mann et al. . | |
| 5,600,218 | 2/1997 | Holling et al. . | |
| 5,821,713 | 10/1998 | Holling et al. . | |
| 5,847,524 | 12/1998 | Erdman et al. | 388/813 |

*Primary Examiner*—Jonathan Salata
*Attorney, Agent, or Firm*—Haugen Law Firm PLLP

[57] ABSTRACT

An apparatus for controlling the speed of rotation of the rotor of a brushless DC motor wherein means are provided for shifting both the on and off angle of motor excitation in opposite senses to thereby widen or narrow the pulse of energization to motor winding(s).

8 Claims, 5 Drawing Sheets

SPEED CONTROL FOR BRUSHLESS DC MOTORS

BACKGROUND OF THE INVENTION

I. Field of the Invention

This invention relates to the broad field of speed control for brushless DC motors, with respect to which there are a number of prior art methods and apparatus. The present invention is distinguished from the prior art arrangements of which we are aware by providing a unique control arrangement that is relatively simple to implement and yields excellent performance with improved efficiencies of operation.

Figure 2:
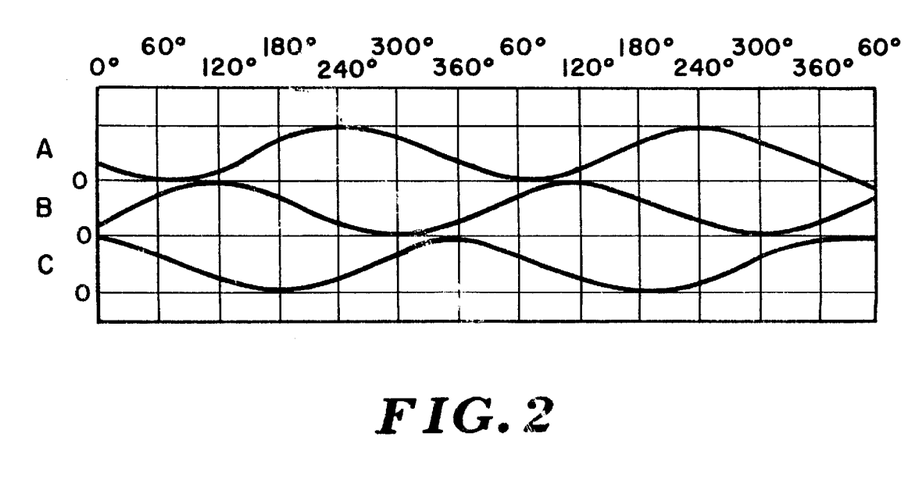
FIG. 2 is a diagram of the BEMF voltages for the three phases of the motor of FIG. 1.

FIG. 2 shows the idealized back-EMF (BEMF) waveforms of a 3ϕ brushless motor. There is a direct relationship between the BEMF and the torque constant $K_t$ of a brushless motor, where the torque constant is proportional to the BEMF or VEMF constant $K_t(\alpha)$. The motor's BEMF is the BEMF constant multiplied by the motor's speed:

$$V_{EMF}=V_{EMF}(\alpha)=K_t(\alpha)\omega=K_t(\alpha)\cdot K_t\omega \quad (1)$$

Thus, the motor's phase torque $T_{ph}(\alpha)$ is the product of the torque constant $K_t(\alpha)$ multiplied by the motor's phase current $1_{ph}$:

$$T_{ph}(\alpha)=K_t(\alpha)1_{ph} \quad (2)$$

The losses in the motor are partially determined by the phase current. The $I^2R$ losses $PL_{cu}$, or copper losses, in the motor are given by:

$$PL_{cu} = I_{ph}^2 R_{PH} = \frac{R_{ph}}{2\Pi} \int_0^{2\Pi} I_{ph}^2(\alpha) d\alpha \quad (3)$$

The object of the invention is to control the torque output of the motor and thus its speed while optimizing its efficiency, which is mainly achieved through minimizing its $I^2R$ losses.

For the purposes of this discussion and without restricting the principle, we will assume that the BEMF waveform is sinusoidal as shown in FIG. 2 and which is a good approximation for the actual BEMF waveform of many brushless motors.

For a given constant current the available torque per phase is:

$$T_{ph}=f(\alpha)=T_{ph}(\alpha)=K_t\cdot\sin(x)\cdot I_{ph} \quad (4)$$

and the output power is:

$$P = \frac{2K_T I_{ph}}{\Pi}\sin(x)\cdot \omega K_2 \quad (5)$$

The $I^2R$ losses are:

$$PL_{cu}=I^2\cdot R=i(P)^2 R \quad (6)$$

for a total efficiency of:

$$\eta = \frac{P}{P + PL_{cu}} \quad (7)$$

The conventional brushless motor control will maintain a fixed commutation angle of 120° of 180°, or 180° of 180°. To reduce the torque output of the motor it is simply required to reduce the total motor current.

This may not be the most efficient operation of the motor, however. Yet this control can be implemented easily by using hall sensors for commutation or one of many sensorless commutation methods to yield an efficient, low cost controller.

A similar reduction in motor torque can be achieved if, instead of lowering the motor current, the current will be conducted for a shorter period of time, preferably at those positions, where the torque constant is the highest.

We can now maximize the expression in (7) and determine the optimal turn-on time for a given power or torque output. From the output torque:

$$T = \frac{P}{K_2\omega}, \text{ or } P = k_2 \cdot \omega \cdot T \quad (8)$$

we can determine the current required for a certain torque output:

$$\frac{2\cdot K_t \cdot I_{ph}\cdot \sin(x)}{\Pi} = T = \frac{P}{\omega}I_{ph} = \frac{P\cdot \Pi}{2\cdot k_2\omega \cdot K_t \cdot \sin(x)} \quad (9)$$

and the resulting $I^2R$ losses:

$$I^2R = \frac{P^2\cdot R\cdot \Pi}{4\cdot (k_2\omega)^2 \cdot K_t^2} \cdot \frac{x}{\sin^2(x)} \quad (10)$$

From (9) and (10) we determine the motor efficiency as:

$$\eta = \frac{1}{1 + \frac{P\cdot R\cdot \Pi}{4\cdot (k_2\omega)^2 \cdot K_t^2}\cdot \frac{x}{\sin^2(x)}} \quad (11)$$

Finally, we can optimize (11) by minimizing (10) which yields:

$$\min\left(\frac{x}{\sin^2(x)}\right) = 67° \quad (12)$$

Thus, from (12) we determine, for the above assumptions, the motor will operate at its peak efficiency at a commutation angle of 67° centered around the peak torque point; however the conventional method of 6-step commutation results in reduced motor efficiency.

The above analysis had assumed that the current can be fixed regardless of the commutation position of the motor. In most instances, this is not the case but the motor current will depend on the commutation as well there will be a rise time associated with the current. Thus, for a small commutation angle the torque, which can be achieved will be smaller than the above theoretical value and the commutation angles will not be the optimal angles derived above.

Figure 3:
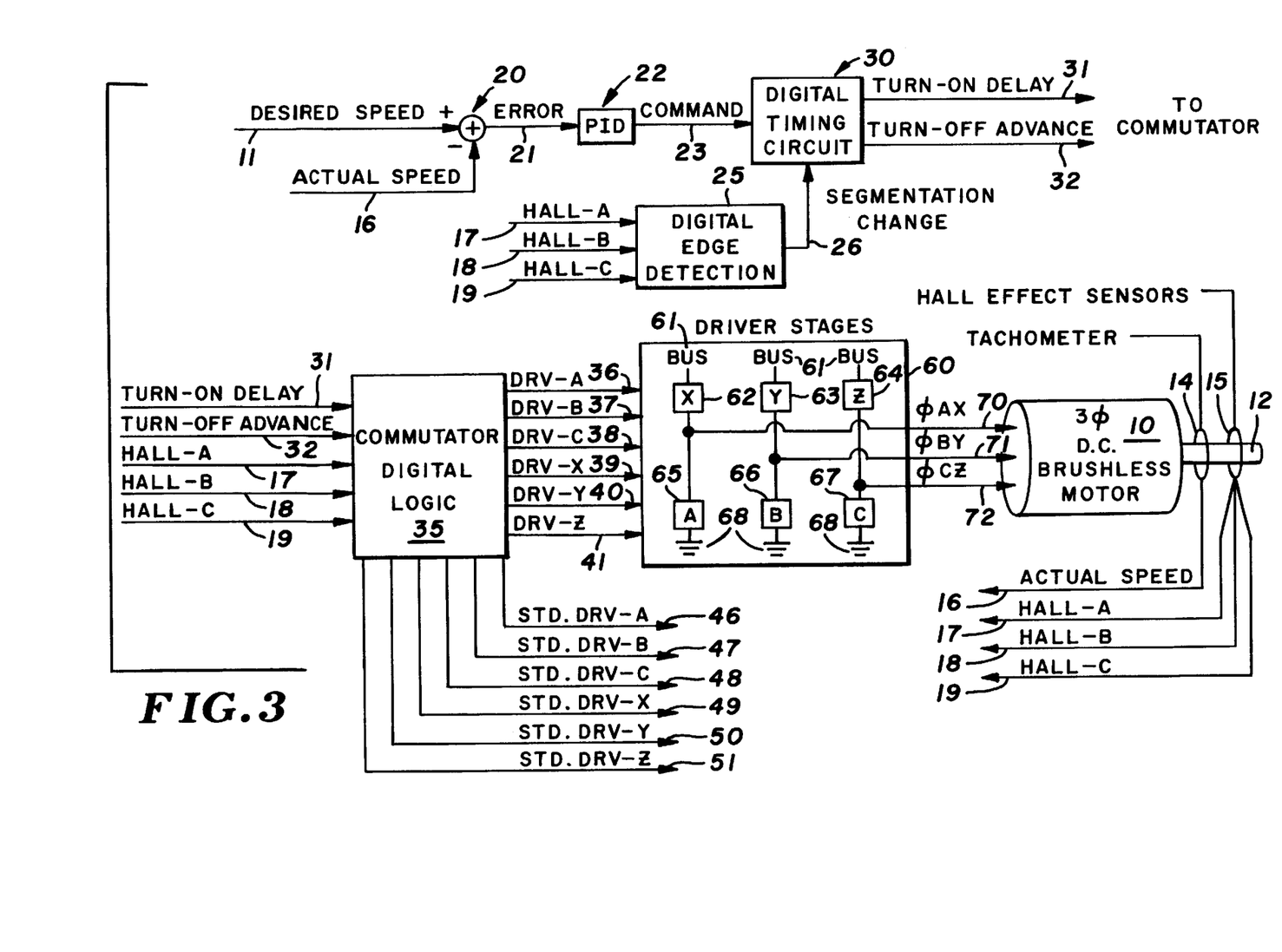
FIG. 3 is a schematic diagram of a control system for controlling the speed of the motor of FIG. 1 and utilizing our invention.

Conversely, we can use this feature to control torque, while at the same time commutating the motor with improved efficiency. This can be achieved by designing a commutator with variable commutation angles. The duration of the commutation determines the efficiency of the system, while the commutation position determines the torque. The block diagram of this commutator is shown in FIG. 3. The commutator can be implemented both analog and digitally, as well as using dedicated hardware or a microcontroller.

OBJECTS AND SUMMARY OF THE INVENTION

A primary objective of this invention is to provide an improved method and apparatus for controlling the speed of a DC brushless motor.

Another object of this invention is to control the torque output of the motor and thus its speed, while optimizing its efficiency which is mainly achieved through minimization of the $I^2R$ losses of the motor.

Thus, in accordance with a broad aspect of the present invention, a method and apparatus are described for controlling the speed of a brushless DC motor having one or more field coils disposed about a rotor, wherein the field coils have at least one active field coil for receiving a driving signal to generate a magnetic field that exerts the maximum amount of torque on the rotor. More specifically, the invention includes motor field coil switching means adapted to be connected to a preselected DC voltage bus and being respectively connected to the motor field coils and adapted to be selectively actuated so that the DC bus is selectively connected to the coils.

In the preferred embodiment of the invention shown, the motor has three fields coils. However, it is to be understood that the invention is applicable to all brushless DC motors having one or more coils. The invention further includes a means for producing a signal indicative of the actual speed of rotation of the rotor, as well as means for producing a signal indicative of the desired speed of rotation of the rotor.

Comparative means are provided for producing an error signal indicative of the difference between the actual speed signal and the desired speed signal. Means are also provided for receiving and selectively processing the error signal so as to produce a command signal.

The invention further includes means for determining the commutation position of the rotor, including output means thereof and detection means connected to the output means of the commutation position determination means, the detection means being adapted to produce an output indicative of the segmentation change of the rotor.

The invention also includes digital timing circuit means connected to receive the command signal and the detection means output and including means for producing turn-on delay and turn-off advance signals. Commutator digital logic means are also provided and are connected to receive (i) said turn-on delay signal; (ii) said turn-off advance signal; and (iii) a signal from the output means of the commutation position determination means, the commutator digital logic means further comprising digital logic means for producing a plurality of motor coil drive signals.

Finally, means are provided for selectively connecting the aforesaid plurality of motor coil drive signals respectively to control the plurality of motor field coil switching means so as to selectively connect the DC voltage bus to the field coils. The motor speed is controlled with ease and with efficiency as follows. To increase the rotor speed, the turn-on delay and turn-off advance signals are decreased and increased respectively so as to increase the pulse width of the pulses of current to the coils. Conversely, to decrease speed, the turn-on delay and turn-off advance signals are increased and decreased respectively to decrease the pulse width of the pulses of current to the coils.

BRIEF DESCRIPTION OF THE DRAWINGS

In the drawings wherein like numerals are utilized to designate like parts throughout the same.

DETAILED DESCRIPTION OF THE PREFERRED EMBODIMENT

Figure 1:
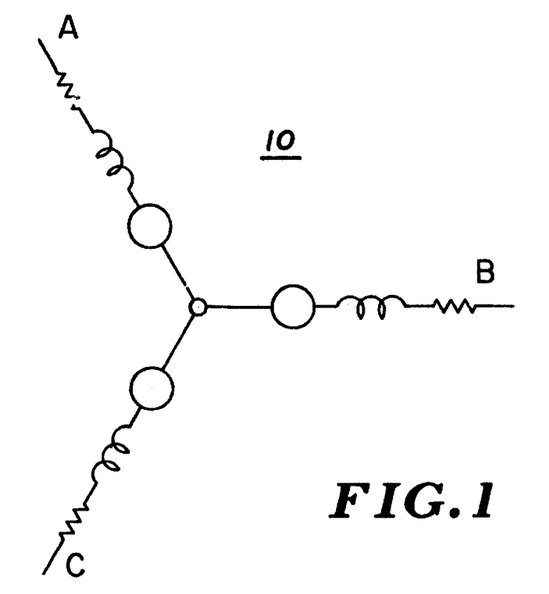
FIG. 1 is a schematic equivalent circuit diagram of a polyphase DC brushless motor depicted as a three-phase or winding motor having a rotor (not shown in this view)

Referring to FIG. 1, a polyphase DC brushless motor 10 is shown schematically; in this case the motor has three phases or windings identified respectively as ØA, ØB and ØC.

As stated above, the invention is applicable to the speed control of brushless DC motors having at least one winding.

The BEMF voltages for windings A, B and C are shown in FIG. 2, a timing chart representation showing six 60° segments for each 360° rotation of the rotor. Thus FIG. 2 depicts ØA during the first segment of 60° to be descending to zero, ØC is descending from its maximum value and ØB is ascending. In FIG. 2, the BEMF voltages are depicted as sinusoidal; this is a theoretical depiction; in actual practice there may be some variation, but that does not effect the overall impact of our invention.

In FIG. 3, the three phase DC brushless motor 10 is depicted schematically as including a rotor (shaft) 12 having associated therewith a tachometer 14 of standard configuration for producing an actual speed signal 16.

Also associated with the rotor is a means for determining the commutation position of the rotor; for the purpose of depicting the preferred embodiment, the commutation position determination means is depicted in FIG. 3 as a plurality of Hall effect sensors 15 having three output signals, Hall A, Hal B and Hall C respectively, supplied on output leads 17, 18 and 19 respectively. Hall effect sensor type commutation position determination means are well known to those skilled in the art. It should be understood that the invention may utilize other techniques for determining the commutation position of the rotor. For example, the applicant's co-pending application entitled "Sensorless Commutation Position Detection for Brushless Motors" filed Sep. 11, 1995, Ser. No. 08/526,525 now U.S. Pat. No. 5,600,218, disclosed an apparatus and method for providing real-time commutation position detection by utilizing the back electromotive force (BEMF) voltage of the open or off phase of the motor to determine the position of the rotor. Also other techniques for determining the commutation position of the rotor may be utilized with this invention.

Referring to the upper left portion of FIG. 3, the actual speed signal 16 (an analog signal) is applied to one of the inputs of a summing point of comparator means 20 having a second input connected to receive a desired speed analog signal on lead 11. If there is a difference between the actual speed signal and the desired speed signal, then an error signal is developed at an output 21 of comparator 20; the error signal is applied to a proportional integration device (PID) for signal processing, to yield a command signal at an output 23 thereof which in turn is applied as an input to a digital timing circuit 30 having a pair of outputs, i.e., a turn-on delay output 31 and a turn-off advance output 32.

The three outputs from the Hall effect sensors, i.e., leads 17, 18 and 19, are applied as inputs to a digital edge detection means 25, a solid state apparatus using technology well known to those skilled in the art for producing a pulse output upon the beginning of each segment of rotor rotation. This signal is applied to an output 26 which constitutes a second input to the digital timing circuit 30. These pulse outputs are identified in FIG. 5 by the designator AA and it will be seen that the pulses occur for each 60° segment at the beginning of the segment, i.e., at 0°, 60°, 120°, 180°, 240° and 300°.

Figure 4:
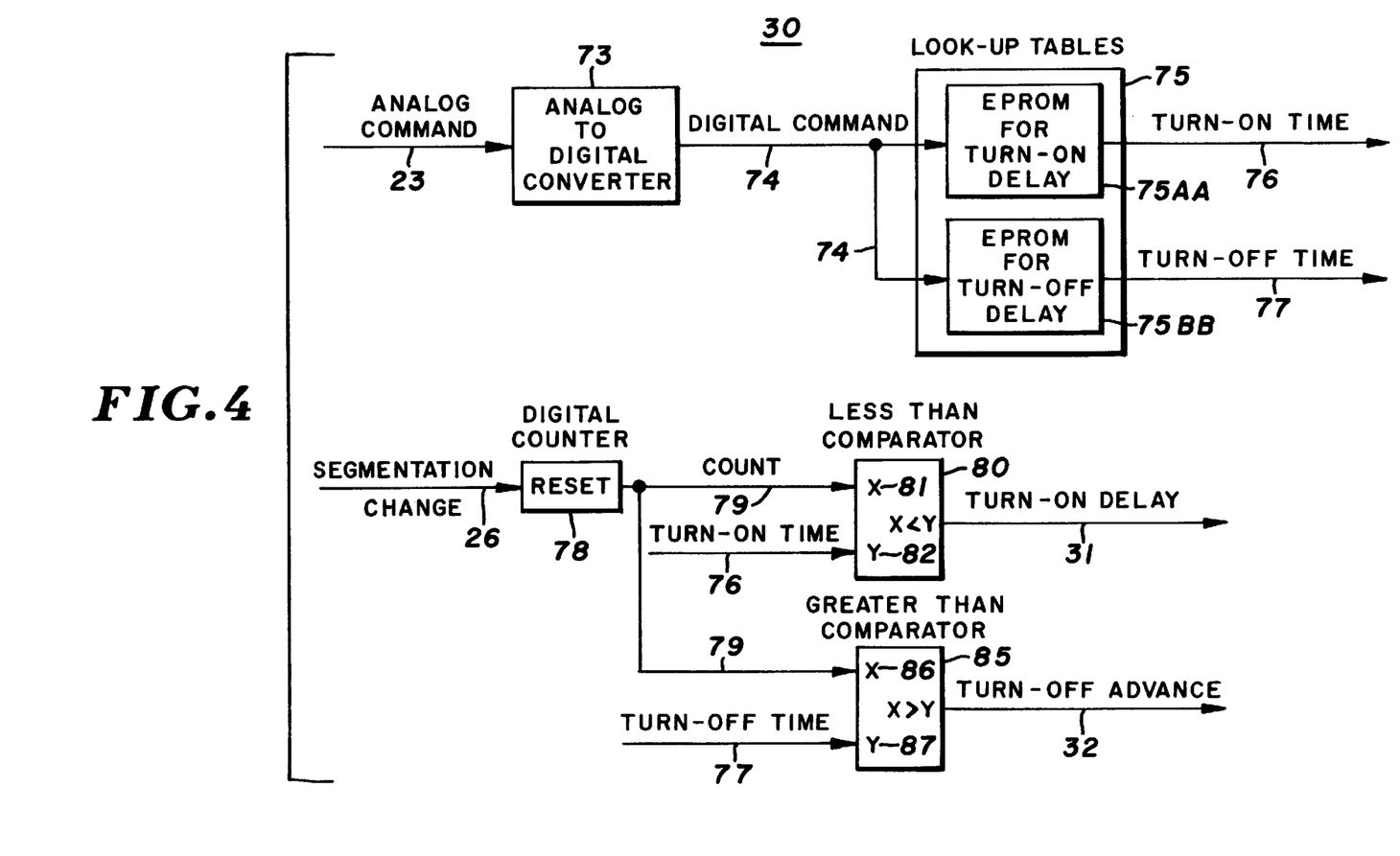
FIG. 4 is an expanded schematic diagram of the digital timing circuit 30 shown in FIG. 3.

Referring to FIG. 4, the digital timing circuit 30 is shown in greater detail. The analog command signal 23 is applied to an analog to digital converter 73, the output of which is a digital signal representative of the analog input, the output is identified by reference numeral 74 which constitutes an input for a pair of timing devices depicted as EPROMs jointly constituting look-up tables 75. More specifically, device 75 constitutes a first EPROM for turn-on delay 75AA and a second EPROM for turn-off delay 75BB. These units respectively have outputs 76 and 77 on which are produced turn-on time and turn-off time signals. These signals are digital. Other timing devices known to those skilled in the art can be used for the timing devices 75AA and 75BB. Simulation techniques can be used to customize the timing devices.

With reference again to FIG. 4, a digital counter 78 has applied as an input thereto, the segmentation change signal 26 which functions to reset the digital counter for each pulse AA produced by the digital edge detection means 25. The digital counter 78 has an output 79 connected to the X input of a pair of comparators, more specifically to a "less than" comparator 80 and a "greater than" comparator 85. Comparator 80 has X input 81 for receiving the count 79 and a Y input 82 for receiving the turn-on time signal 76; the output from comparator 80 is the turn-on delay output 31 also shown in FIG. 3. The "less than" comparator 80 compares the values of X and Y; if X is less than Y, the turn-on delay digital signal 31 is a "one" and if X is greater than Y, the output at 31 is a "zero".

The "greater than" comparator 85 has X and Y terminals 86 and 87 connected respectively to receive the count output 79 from the digital counter 78 and the turn-off time signal 77 from EPROM 75BB; comparator 85 also has an output 32 shown also in FIG. 3. Comparator 85 compares the X and Y signals and if X is greater than Y, the digital signal at output 32 is a "one". If X is less than Y, the output at 32 is a "zero".

Referring to FIG. 3, a commutator digital logic means 35 is connected to receive turn-on delay signal 31, turn-off advance signal 32 and the three Hall effect sensor signals 17, 18 and 19. The commutator digital logic means 35 is shown to have six outputs for driving or controlling the energization of the motor, labeled DRV A, DRV B, DRV C, DRV X, DRV Y and DRV Z, and further identified respectively by leads 36, 37, 38, 39, 40 and 41.

Figure 5:
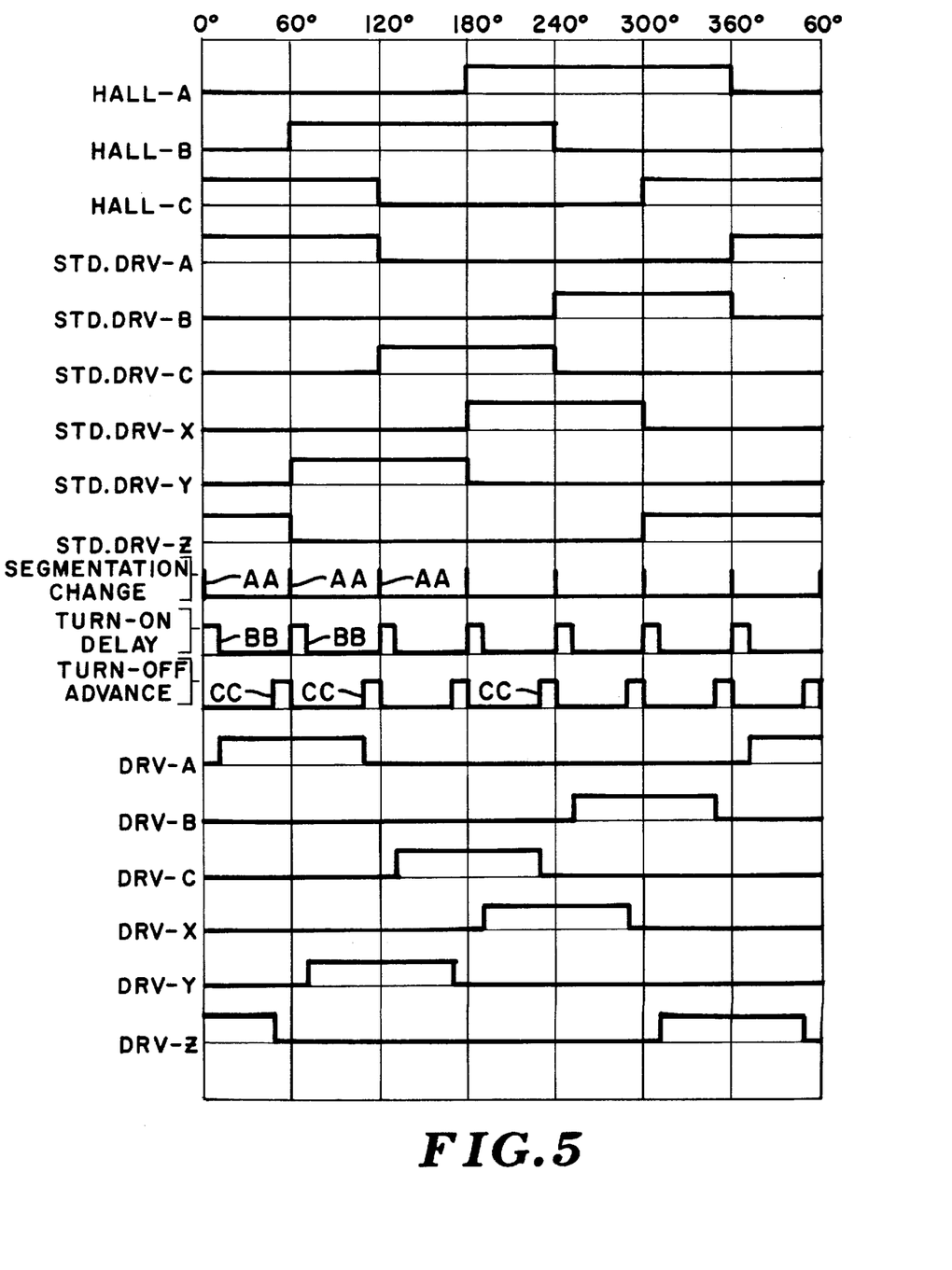
FIG. 5 is a timing chart for the invention depicted in the drawings.

Commutator digital logic means 35 is further shown to have six more outputs STD-DRV-A, STD-DRV-B, STD-DRV-C, STD-DRV-X, STD-DRV-Y and STD-DRV Z respectively on leads 46, 47, 48, 49, 50 and 51; these outputs are for illustrative purposes only; they are depicted on the FIG. 5 timing chart to assist the understanding of the invention, To repeat, leads 46–51 would not normally be provided in the actual use of the invention.

A motor field coil switching means 60 (preferably a solid state device) is adapted to be controlled selectively so as to selectively (i) apply DC bus voltage or (ii) connect ground to the three motor windings, ØAX, ØBY, and ØCZ identified further by reference numerals 70, 71 and 72 respectively. Thus switching means 60 has X, Y and Z blocks 62, 63 and 64 respectively connected to leads 70, 71 and 72; whenever block 62, 63 or 64 are selectively closed, then DC bus voltage 61 is applied to the respective winding. Further, switching means 60 includes A, B and C blocks 65, 66 and 67 all connected to ground 68 and, when actuated by the commutator digital logic means 35, has the effect of connecting ground to windings 70, 71 and 72. Switches X, Y and Z are controlled by outputs 39, 40 and 41 respectively of logic means 35, and ground switches 65, 66 and 67 are controlled respectively by the signals on leads 36, 37 and 38.

Referring to FIG. 5, the top three diagrams show the outputs of the Hall effect sensors Hall A, Hall B and Hall C. The next six diagrams are for STD-DRV-A, STD-DRV-B, STD-DRV-C, STD-DRV-X, STD-DRV-Y and STD-DRV Z; these "standard" drive signals are for timing diagram reference only and show the case of the motor receiving maximum energization voltage, i.e., maximum duration. For example, STD-DRV-A signal is at a maximum for a full double segment, i.e., from 0° to 120°. STD-DRV-C is on for the full double segment of 120° to 240° and STD-DRV-B is on for the full double segment from 240° to 360° or 0°.

The next diagram shows the segmentation change pulses AA described above, followed by typical values of the turn-on delay and turn-off advance signals BB and CC respectively. More specifically, the turn-on delay pulse BB is shown to start with pulse AA and continue for (say 15°) and then go to zero. The turn-off advance signal is zero until (say 15°) before the end of the 60° segment. It should be understood that the width of pulses BB and CC is a direct function of the magnitude of the signals found on outputs 31 and 32 of the digital timing circuit 30. The bottom six diagrams on FIG. 5 depict the actual DRV-A through DRV-Z signals that correspond to the depicted values of the turn-on delay and turn-off advance shown above in FIG. 5.

FIG. 5 permits a comparison between the actual drive signals and the STD-DRV signals. For example, the STD-DRV-A signal shows energization for a double segment, i.e., from 0° through 120°. The actual DRV-A signal (for the BB and CC examples depicted) shows that the energization to switch A by switching means 60 does not occur until the end of the turn-on delay signal BB and then is reduced to zero prior to 120° by the leading edge of the turn-off advance signal CC. In the same manner comparisons can be made between the standard and the actual drives for B, C, X, Y and Z.

It will be further noted from the timing diagram that, within the switching means 60, switches 62 and 65 are never on at the same time, as this would short the DC bus to ground, nor are switches 63 and 64 on at the same time as their companion switches 66 and 67 respectively.

Assume that the actual speed 16 is greater than the desired speed 11; this will produce an error signal 21 to have the effect, as explained above, to increase the turn-on delay 31 and increase the turn off advance 32. Thus the pulses BB and CC shown in FIG. 5 would increase in time duration or width, and this would cause the widths of the DRV-X, DRV-Y and DRV-Z pulses to be reduced. Stated otherwise, the system functions to shift both the on and off angle of the motor drive pulses to widen or narrow them depending upon whether more or less torque is required.

It should be recognized that prior art arrangement, have used phase advance for motor control; however, these arrangements shift both the on and off angle by the same amount. The present invention, as indicated, shift both the on and the off angle in opposite senses to widen or narrow the pulse of energization to the motor windings. This arrangement yields a higher efficiency as compared to prior art control circuits.

Figure 6:
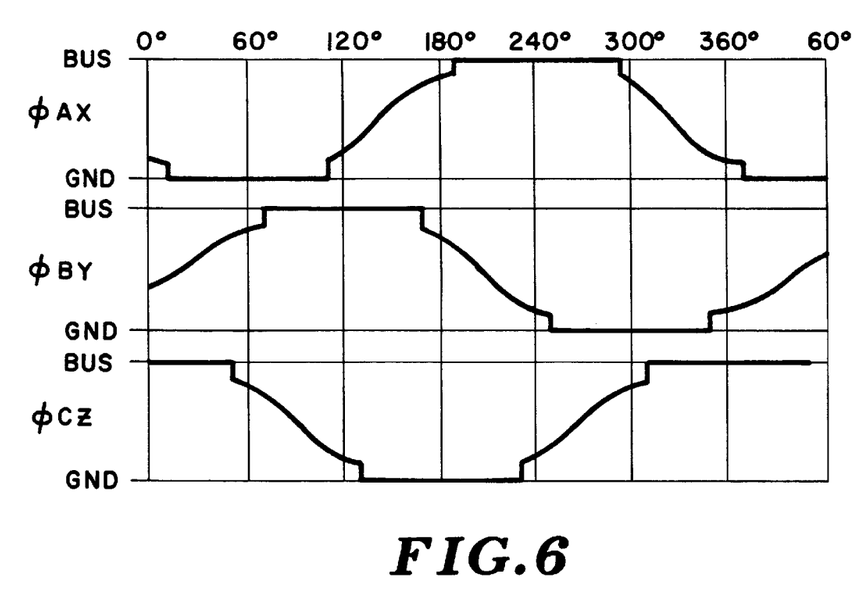
FIG. 6 is a timing diagram showing voltages applied to the three phases of the motor for a full 360° of rotation, i.e., one full rotation of the rotor.

FIG. 6 shows a timing diagram for speed control of the motor; more specifically, it shows the voltages at leads 70, 71 and 72 for phase ØAX and ØCZ respectively. Referring to FIG. 6 for ØAX, at the end of turn-on delay pulse BB, DRV-A goes positive to close switch 65, thus grounding lead 70 until the leading edge of turn-off advance pulse CC. From that point (approximately 105°), the voltage on lead 70 follows the BEMF voltage for Phase A shown in FIG. 2. At about 195°, DRV-X goes positive to close swatch 62 to apply full voltage to lead 70 until about 285°, at which point the BEMF voltage for Phase A is depicted.

Using the same methodology, the energization and the grounding of leads 71 and 72 can be followed by reference to FIGS. 5 and 6.

We claim:

1. An apparatus for controlling the speed of rotation of the rotor of a brushless DC motor having at least one field coil disposed about said rotor and adapted to be energized with driving signals to generate a rotating magnetic field for exerting torque on said rotor, said apparatus comprising:
   a) means for determining the commutation position of said rotor, including output means thereof;
   b) motor field coil switching means adapted to be connected to a preselected DC voltage bus, being respectively connected to said at least one field coil, and adapted to be selectively actuated so that said DC bus is selectively connected to said at least one coil;
   c) means for producing a signal indicative of the actual speed of rotation of said rotor;
   d) means for producing a signal indicative of the desired speed of rotation of said rotor;
   e) means for producing an error signal indicative of the difference between said signals indicative of the desired speed of rotation of said rotor;
   f) means for receiving and selectively processing said error signal so as to produce a command signal;
   g) detection means
      i) connected to said output means of said commutation position determination means; and
      ii) adapted to produce an output indicative of the segmentation change of said rotor;
   h) digital timing circuit means connected to receive said command signal and said output of said detection means and including means for producing turn-on delay and turn-off advance signals;
   i) commutator means connected to receive
      i) said turn-on delay signal;
      ii) said turn-off advance signal; and
      iii) a signal from said output means of said commutation position determination means, and further comprising digital logic means for producing motor coil drive signals; and
   j) means for selectively connecting said motor coil drive signals respectively to control said plurality of driver stages to selectively connect said DC voltage bus to said at least one field coil,
   whereby the speed of said rotor is controlled as follows:
      a) to increase speed, the turn-on delay and turn-off advance signals are decreased and increased respectively to increase the pulse width of the pulses of current to said at least one coil; and
      b) to decrease speed, the turn-on delay and turn-off advance signals are increased and decreased respectively to decrease the pulse width of the pulses of current to said at least one coil.

2. Apparatus of claim 1 further characterized by said digital timing circuit means including an analog to digital converter connected to receive said command signal and having digital output signals.

3. Apparatus of claim 1 further characterized by said digital command output signal being applied to both of first and second EPROMs characterized by producing (i) turn-on time, and (ii) turn-off time signals respectively.

4. Apparatus of claim 1 further characterized by said digital circuit timing means include reset means (i) connected to receive said output indicative of the segmentation change of said rotor and (ii) having an output connected to first inputs of first and second comparators, said first and second comparators (a) each having a second input connected respectively to receive said turn-on time and turn-off time signals, and (b) having turn-on delay and turn-off advance outputs respectively.

5. An apparatus for controlling the speed of rotation of the rotor of a brushless DC motor having at least one field coil disposed about said rotor and adapted to be energized with driving signals to generate a rotating magnetic field for exerting torque on said rotor, said apparatus comprising:
   a) means for determining the commutation position of said rotor, including output means thereof;
   b) motor field coil switching means adapted to be connected to a preselected DC voltage bus, being respectively connected to said at least one field coil, and adapted to be selectively actuated so that said DC bus is selectively connected to said at least one coil;
   c) means for producing a signal indicative of the actual speed of rotation of said rotor;
   d) means for producing a signal indicative of the desired speed of rotation of said rotor;
   e) means for producing a command signal indicative of the difference between said signals indicative of the desired speed of rotation of said rotor;
   f) detection means adapted to produce an output indicative of the segmentation change of said rotor;
   g) timing circuit means connected to receive said command signal and said output of said detection means and including means for producing turn-on delay and turn-off advance signals;
   h) commutator means connected to receive
      i) said turn-on delay signal;
      ii) said turn-off advance signal; and
      iii) a signal from said output means of said commutation position determination means, and further comprising means for producing motor coil drive signals; and j) means for selectively connecting said motor coil drive signals respectively to control said plurality of driver stages to selectively connect said DC voltage bus to said at least one field coil.

6. Apparatus of claim 5 further characterized by said timing circuit means including an analog to digital converter connected to receive said command signal and having digital output signals.

7. Apparatus of claim 6 further characterized by said digital command output signal being applied to both of first and second EPROMs characterized by producing (i) turn-on time, and (ii) turn-off time signals respectively.

8. Apparatus of claim 7 further characterized by said timing circuit means including reset means (i) connected to receive said output indicative of the segmentation change of said rotor and (ii) having an output connected to first inputs of first and second comparators, said first and second comparators (a) each having a second input connected respectively to receive said turn-on time and turn-off time signals, and (b) having turn-on delay and turn-off advance outputs respectively.

* * * * *